May 21, 1940.   A. W. STAUDT   2,201,747
METHOD OF PRODUCING MOISTUREPROOF CELLULOSIC PELLICLES
Filed Sept. 27, 1935
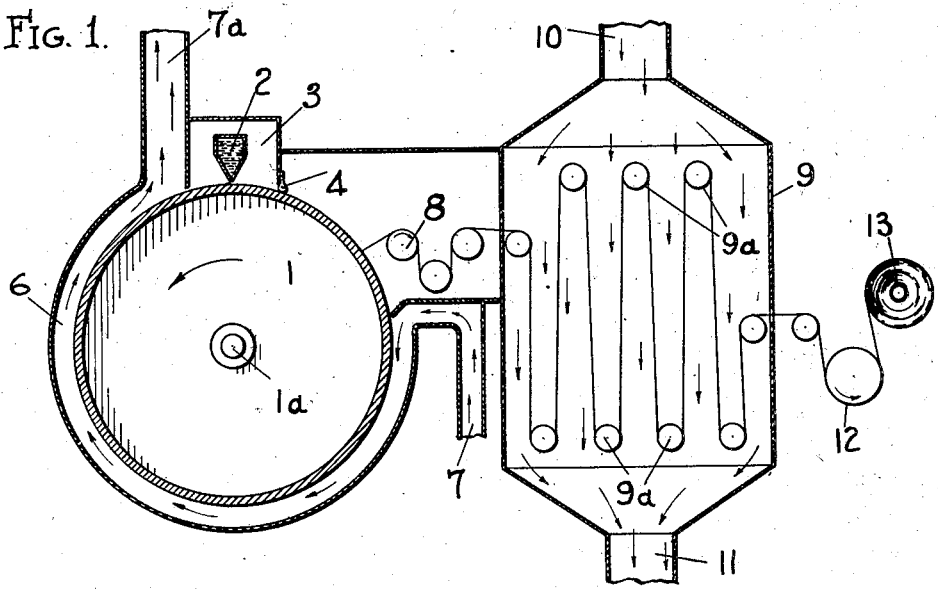
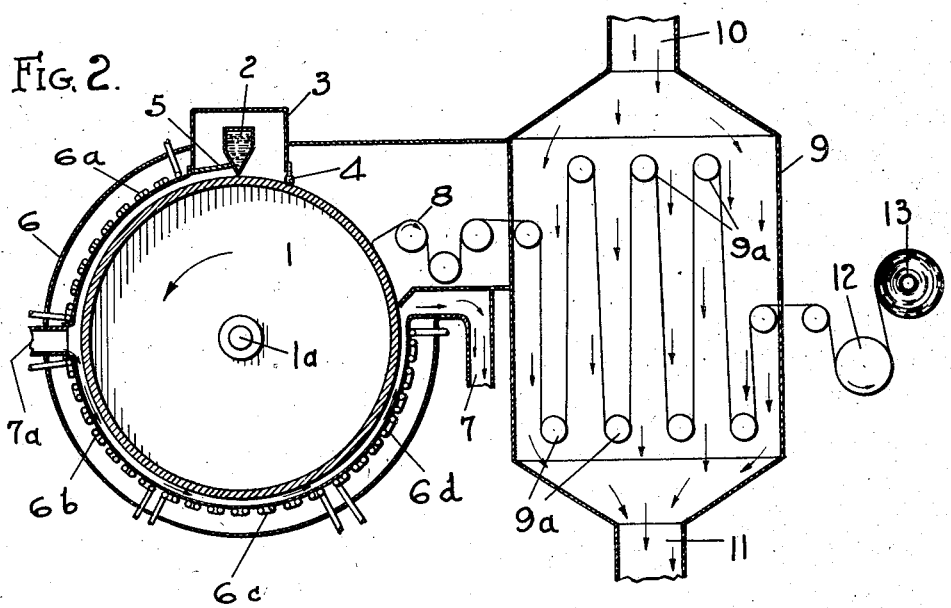
INVENTOR.
Ambrose W. Staudt
BY
Charles F. Daley
ATTORNEY.

Patented May 21, 1940

2,201,747

UNITED STATES PATENT OFFICE 2,201,747

METHOD OF PRODUCING MOISTUREPROOF CELLULOSIC PELLICLES

Ambrose W. Staudt, Kenmore, N. Y., assignor, by mesne assignments, to E. I. du Pont de Nemours & Company, Wilmington, Del., a corporation of Delaware Application September 27, 1935, Serial No. 42,445

1 Claim. (Cl. 18—57)

This invention relates to thin pellicles of cellulose derivatives suitable for use as wrapping materials. It relates particularly to such pellicles which are clear, transparent, flexible, non-tacky and moistureproof and which are obtained by direct casting of an organic cellulose derivative composition, that is, a composition comprising compounds of cellulose with other organic substances, e. g., organic acids. More particularly, the invention relates to moistureproof cellulose acetate wrapping tissues.

In recent years it has become the practice in many packaging arts to wrap commodities in transparent cellulosic wrapping materials, as, for example, regenerated cellulose pellicles, cellulose acetate pellicles, and the like. Many commodities are maintained in optimum condition only if the wrapper is capable of inhibiting or retarding the ingress or egress of moisture from the package, and to supply this need moistureproofed regenerated cellulose pellicles have been provided wherein the regenerated cellulose base has been coated with a moistureproofing coating composition, as, for example, a lacquer comprising a cellulose derivative, a resin, or blending agent, a wax and preferably a plasticizer, such as disclosed, for example, in the U. S. Patent to William Hale Charch et al., No. 1,737,187. One of the disadvantages attendant on the use of such regenerated cellulose pellicles resides in the water sensitivity of the cellulose base and unless special precautions are taken, the moistureproofing coating will become disengaged from the base if direct contact with liquid moisture is permitted for appreciable periods of time. The water sensitivity of regenerated cellulose pellicles is also responsible for a certain amount of deformation which the pellicle may undergo as the result of varying conditions of humidity. On the other hand, organic cellulose derivative pellicles and more particularly cellulose acetate pellicles are not appreciably water-sensitive and consequently are not affected by changes in humidity. Like regenerated cellulose pellicles, however, they are not moistureproof. Attempts to render them moistureproof by coating have not been generally successful because coating compositions capable of moistureproofing usually require the presence of solvents which are sufficiently active to strike through the thin pellicles and either completely destroy them or render them extremely difficult to handle.

In the U. S. Letters Patents to Charch et al., Nos. 1,737,187 and 1,826,696, is disclosed a method for the production of transparent, moistureproof sheets of cellulose derivatives. It has now been found that a moistureproof, flexible, non-tacky pellicle having an improved transparency can be produced by direct casting of a film of an organic cellulose derivative composition containing a moistureproofing agent incorporated therein. The invention will be described with particular reference to cellulose acetate pellicles, but it will be understood that other organic cellulose derivatives may be used, as will be more specifically set forth hereinafter.

It is therefore an object of this invention to produce organic cellulose derivative pellicles, particularly cellulose acetate pellicles which are useful as wrapping materials, which are cast from such compositions of matter and in such manner that the product is flexible, non-tacky, nongreasy, moistureproof and of improved clearness and transparency.

It is a further object of this invention to provide a method for producing an organic cellulose derivative pellicle which is relatively thin, flexible, non-tacky, non-greasy, moistureproof and which has improved clearness and transparency.

Other objects of the invention will appear hereinafter.

Throughout the specification and claim the term "moistureproof" will be understood as falling within the following definition:

Moistureproof materials are defined as those which, in the form of continuous, unbroken sheets or films, permit the passage of not more than 690 grams of water vapor per 100 square meters per hour, over a period of 24 hours, at approximately 39.5° C. plus or minus 0.5° C., the relative humidity of the atmosphere at one side of the film being maintained at least at 98% and the relative humidity of the atmosphere at the other side being maintained at such a value as to give a humidity differential of at least 95%.

For the purposes of experimental test in the determination of moistureproofness as it applies to the products of the instant invention, an organic cellulose derivative pellicle having a thickness of approximately 0.002" (not more than 0.005") is disposed, at a temperature of 39.5° C. plus or minus 0.5° C. (preferably 39.5° C. plus or minus 0.25° C.), so that one side is in contact with a humid atmosphere while the other side is in contact with a relatively arid atmosphere, the water vapor pressure differential being 50–55 mm. (preferably 53.4 plus or minus 0.7 mm.) of mercury. For convenience, the number of grams of water vapor passed per 100 square meters per hour over a period of 24 hours under these conditions may be referred to as the "permeability value" of the pellicle. Obviously, the greater the degree of moistureproofness the lower will be the permeability value. The ordinary pellicles, such as of cellulose acetate, which are useful as wrapping tissues, show a permeability value of the order of 5000.

The term "moistureproofing agent" is used to designate the material which is primarily responsible for the moistureproofness of the final product. In certain instances the degree of moistureproofness obtained with any given moistureproofing agent may be improved by including in the composition suitable amounts of appropriate plasticizers, blending agents or the like, but these latter alone can not impart moistureproofness.

Generally speaking, the objects of the invention are accomplished by providing a casting composition comprising an organic cellulose derivative, a moistureproofing agent and a plasticizer, and maintaining the ingredients compatible with each other by use of a suitable blending agent, all dissolved in a suitable solvent or solvent mixture; spreading the solution in the form of a thin layer on a polished casting surface such as a plate, wheel, band, mandrel or the like; evaporating the solvent under conditions which will be favorable to the formation of a smooth pellicular surface and preferably at a temperature which is at all times above the point at which the moistureproofing agent will crystallize from the composition; stripping the pellicular structure from the casting surface with or without subsequent aftertreatment for conditioning or the like.

As the organic cellulose derivative which is to form the basis for the pellicular structure, it is preferable to use cellulose acetate since this is readily available in a variety of degrees of esterification, viscosity, solubility, or the like. Cellulose acetate having an acetyl content (calculated as combined acetic acid) of from 52% to 58% inclusive will be useful although an acetyl content of about 56% will be found advantageous. The viscosity of the cellulose acetate will be chosen with particular regard to the solvents employed as well as the concentration of solids desired in the final casting composition, which composition must, of course, be of such viscosity that it can be readily flowed or doctored to a thin uniform layer on the casting surface. Other cellulose esters or mixed esters as, for example, cellulose propionate, cellulose butyrate, cellulose aceto-propionate, cellulose aceto-butyrate, likewise cellulose ethers, such as ethyl cellulose, or even cellulose ether-esters, may be employed if desired, either alone or in combination with each other or with cellulose acetate.

The choice of plasticizer for the organic cellulose derivative is dependent in large measure on the cellulose derivative chosen and generally, any one or several of the common and well known plasticizers may be used. Among those which can be employed to advantage with cellulose acetate may be mentioned butyl-o-benzoylbenzoate, butyl phthalyl butyl glycollate, methoxyethyl phthalate, diethyl phthalate, N-ethyl p-toluene sulfonamide, N-monethylol p-toluene sulfonamide, N-cyclohexyl p-toluene sulfonamide, tricresyl phosphate, or the like. These plasticizers may be used alone or in combination with each other or other plasticizers which have not been mentioned specifically. Certain plasticizers are found to have a compatibilizing or blending action on the cellulose derivative-moistureproofing agent mixture and this property can be used frequently to improve or enhance moistureproofness and transparency as well as flexibility or even the surface characteristics of the final pellicle. The quantity of plasticizer may be varied within wide limits depending on the softness and flexibility desired in the pellicle. Usually plasticizer in the amount of 20–40% based on the total solids of the composition will be satisfactory although 25–35% will be found to be advantageous for most purposes.

As the moistureproofing agent, it has been found preferable to use a wax or wax-like substance and particularly one of rather high melting point. Paraffin wax, having a melting point of approximately 62° C. is particularly well adapted to the purposes of this invention, but paraffin waxes of higher or lower melting point may be used, depending on the degree of moistureproofness and/or the surface characteristics desired. Other waxes such as spermaceti, montan wax, palm wax or the like may be employed and indeed, other organic materials which may not be waxy in character but which have moistureproofing properties may be used successfully. Examples of these last types of materials are disclosed in copending applications Serial Nos. 758,652 to 758,661 inclusive to Charch, Brubaker and Meigs. These moistureproofing materials may be used alone or in combination and ofttimes the clarity, moistureproofness, and/or surface characteristics will be enhanced by a proper combination. Thus, a mixture of montan wax and paraffin wax will aid in securing good surface characteristics. The amount of moistureproofing agent which may be used varies with the other components and is usually small, generally constituting about 0.1–1.0% of the total solids of the composition. With organic cellulose derivatives which are normally more compatible with the moistureproofing agent, the latter may constitute up to 5.0% or more of the total solids of the composition.

Many organic cellulose derivatives, including cellulose acetate, are not normally compatible with appreciable quantities of moistureproofing agents, especially the waxes, and accordingly it is desirable, if good moistureproofness, clarity, transparency, etc., are to be obtained, to employ a material which will act as a blending agent for these normally incompatible constituents. Materials which are useful in this capacity fall into two convenient classes which may be designated as resinous and non-resinous.

Among the resinous blending agents may be mentioned hydrogenated rosin, gum elemi, sulfonamide-aldehyde resins such as p-toluene sulfonamide-formaldehyde resin, monoethylene dibenzoylbenzoate and lactic acid condensation resins. These blending agents may be used alone or in combination with each other or with one or more non-resinous blending agents. The amount of resinous blending agent may range from 0.5–20% and preferably about 1.0–10% of the total solids in the casting composition, depending on the proportion of cellulose derivative to moistureproofing agent and the properties desired in the final product.

A number of non-resinous blending agents will be found effective. In certain instances, plasticizing materials will be found to effect a blending action. As illustrative non-resinous blending agents the following are representative: organic acids such as ricinoleic or lactic acid; aromatic ketones such as acetophenone, di-p-tolyl ketone, benzophenone; aromatic polyhydroxy compounds such as phloro-glucinol, 4-phenyl-1-2-catechol, p-p′ dihydroxy xylene, di-naphthylol methane; high molecular weight alcohols such as stearyl, lauryl, cetyl, myristyl alcohols, octadecane-diol-1,12, that is, the alcohol obtained by the hydrogenation of ricinoleic acid, a commercial mixture of cetyl and stearyl alcohols, a commercial mixture of n-octyl, n-decyl, and lauryl alcohols, or a commercial mixture of stearyl and palmityl alcohols. A slight blending action is also observed with the use of a mono-castor oil acid ester of glycerol (probably essentially mono-glyceryl ricinoleate), trimyristin, p-toluene N-monoethylol sulfonamide or retene. The amount of non-resinous blending agent may vary in the same way as the resinous blending agent although usually less will be required. Thus, about 0.5-5%, and usually 0.5-2.5% of non-resinous blending agent may be sufficient, although larger amounts may be used if desired.

As will be readily understood by those skilled in the art, the organic cellulose derivative, the moistureproofing agent, the plasticizer, the blending agent or the like, constitute the "total solids" of the composition even though one or more of them may be normally liquid. Obviously, care must be taken in choosing these solid ingredients to insure the proper degree of compatibility if good clarity, transparency, moistureproofness, flexibility, etc., are to be obtained in the film produced. It is clear that not all combinations of these solid ingredients will produce equally good results but with the aid of the above disclosure and the examples which will appear hereinafter, the principles of correct formulation become apparent.

Another important factor, after securing a combination of solids which are mutually compatible, is the careful selection of the solvent or solvent mixture used for putting the solids composition into condition for casting. In order that the cast pellicle will exhibit the desired characteristics, the solvent or solvent mixture must form a clear, homogeneous solution of all of the solids, at least at any and all temperatures to which the solution is subjected during mixing, filtering, casting and even solvent removal. Generally, this means that the solvent will dissolve each of the components at a temperature between about 25° C. and the melting point of the moistureproofing agent and will be capable of maintaining the clear solution at and above this solution temperature. The solvent or solvent mixture should have a vapor pressure at the casting and drying temperatures sufficiently low to prevent the formation of bubbles in the pellicle during these operations, but it should not be so low as to make the drying time uneconomically long, especially where continuous manufacture is contemplated. The solvent should retain all of the solid constituents in homogeneous solution throughout the entire drying period during which all of the solvent is removed. This is particularly true of solvent mixtures which must be so compounded that one component will not evaporate so much more rapidly than the others as to cause precipitation of any of the solids in the residue. Different casting conditions will cause different rates of evaporation and unless the mixture is properly balanced, the residual solvent mixture, at some time during the drying period, will be such that one or more of the solid constituents may precipitate out causing a hazy, blushed or opaqued product.

As the solvents for the casting compositions useful in the practice of the invention it is preferable to use medium boiling chlorinated solvents such as sym.-dichlorethane, beta-trichlorethane, trichlorethylene, or propylene dichloride in combination with activating solvents such as dioxan or alcohols including propanol, iso-propanol, ethanol or the like. Alternatively, medium boiling ketones such as methyl ethyl, methyl propyl, methyl isopropyl, methyl butyl or diethyl ketone may be used as the principal solvent in combination with activating solvents such as dioxan, cyclohexanone, alcohols or the like and with or without the addition of wax solvents such as toluene or benzene. In certain instances, the medium boiling activating solvents which are capable of dissolving the solids completely, as for example dioxan, cyclohexanone, or the like, may be used alone. In some cases the best characteristics of the pellicles may be brought out through the use of ethers, esters, ether-esters, etc. as a part of the solvent mixture.

The following solvent mixtures, all proportions being expressed as parts by weight, have been found particularly suitable:

| Solvent | Example I | Example II | Example III | Example IV | Example V | Example VI | Example VII | Example VIII | Example IX | Example X | Example XI | Example XII | Example XIII |
|---|---|---|---|---|---|---|---|---|---|---|---|---|---|
| *Chlorinated solvents* | | | | | | | | | | | | | |
| Sym.-dichlorethane | 90-60 | 70 | -------- | 15 | 70 | -------- | -------- | -------- | -------- | -------- | -------- | -------- | -------- |
| Beta-trichlorethane | -------- | -------- | 75-60 | -------- | -------- | -------- | -------- | -------- | -------- | -------- | -------- | -------- | -------- |
| *Ketone solvents* | | | | | | | | | | | | | |
| Methyl ethyl ketone | -------- | -------- | -------- | 70 | -------- | 97.5-80 | 80 | 60 | -------- | -------- | -------- | -------- | -------- |
| Methyl propyl ketone | -------- | -------- | -------- | -------- | -------- | -------- | -------- | -------- | 64 | 45 | -------- | -------- | -------- |
| *Activating solvents* | | | | | | | | | | | | | |
| Dioxan | -------- | 30 | -------- | -------- | -------- | 2.5-20 | -------- | -------- | 36 | 50 | 100 | -------- | 50 |
| Cyclohexanone | -------- | -------- | -------- | -------- | -------- | -------- | -------- | 20 | -------- | -------- | -------- | 100 | 50 |
| Ethanol (95%) | | | | 15 | 20 | | | | | | | | |
| n-Propanol | 10-40 | | 25-40 | | | | | | | | | | |
| Iso-propanol (anhyd.) | | | | | | | | | | | | | |
| Diacetone | -------- | -------- | -------- | -------- | -------- | -------- | -------- | 20 | -------- | -------- | -------- | -------- | -------- |
| *Other solvents* | | | | | | | | | | | | | |
| Beta-methoxyethanol | -------- | -------- | -------- | -------- | -------- | -------- | -------- | -------- | 20 | -------- | -------- | -------- | -------- |
| Beta - methoxyethyl acetate | -------- | -------- | -------- | -------- | 10 | -------- | -------- | -------- | -------- | -------- | -------- | -------- | -------- |
| Toluene | -------- | -------- | -------- | -------- | -------- | -------- | -------- | -------- | -------- | 5 | -------- | -------- | -------- |

Generally, the casting compositions can be prepared at slightly elevated temperatures, of the order of 35–75° C. Preferably, the solids and solvents are mixed to a clear solution in a closed vessel at a temperature of about 55–70° C. These higher temperatures reduce the time required for solution and since the mixing is done in a closed vessel, no appreciable loss of solvent is experienced. When solution is complete, the mixture is cooled to about 35–40° C. when it is filtered and allowed to stand until free of air bubbles, whereupon it is ready for casting. It is essential that the solution be maintained at all times at a temperature sufficiently high to retain the moistureproofing agent, usually wax, in complete solution. Generally, a temperature of 35–40° C. will suffice.

The following compositions, all proportions being expressed as parts by weight, will be illustrative of those which operate successfully in accordance with the invention. The details of casting, drying, conditioning, etc., will be described later in this specification.

The desired composition, as set forth above, is delivered, by means of a metering pump, to a casting hopper which is maintained at a temperature substantially equal to that of the casting composition, that is, about 35–55° C. As pointed out above, it is essential that the composition be kept warm enough to maintain its homogeneity although in any case the use of a slightly elevated temperature will be advantageous since the attendant decrease in viscosity of the composition will frequently permit the use of a higher solids content. By means of the hopper, a thin layer of the composition is deposited on the highly polished surface of the casting wheel and as the latter revolves, the layer is smoothed to a uniform thickness by a doctor knife, which latter may, if desired, be one of the

|  | Example XIV | Example XV | Example XVI | Example XVII | Example XVIII | Example XIX | Example XX | Example XXI |
|---|---|---|---|---|---|---|---|---|
| *Solids* | | | | | | | | |
| Cellulose acetate (52% HAc) | 68.5 | | | | | | | |
| Cellulose acetate (56% HAc) | | 69.7 | 72.0 | 69.0 | 67.0 | 67.25 | 71.50 | |
| Cellulose acetate (58% HAc) | | | | | | | | 68.5 |
| Butyl-o-benzoyl benzoate | 30.0 | 30.0 | | 30.0 | 30.0 | 10.00 | | 30.0 |
| Butyl phthalyl butyl glycollate | | | 25.0 | | | 10.00 | 25.00 | |
| N-cyclohexyl-p-toluenesulphonamide | | | | | | 10.00 | | |
| Hydrogenated rosin | | | 2.5 | | 2.5 | 2.50 | 2.50 | |
| Lactic acid (pract. 85%) | 1.0 | | | | | | | |
| Myristamide | | | | | | | 0.50 | |
| Cetyl alcohol | | | | 0.5 | | | | |
| Stenol | | | | | | | | 1.0 |
| Paraffin (M. P. 62 C.) | | 0.3 | 0.5 | 0.5 | 0.25 | 0.25 | 0.25 | 0.5 |
| Spermaceti | 0.5 | | | | | | | |
| Montan wax | | | | | 0.25 | | 0.25 | |
| *Solvent* | | | | | | | | |
| Dichlorethane | 70.0 | | 70.0 | 85.0 | 70.0 | 70.0 | 70.0 | 85.0 |
| Iso-propanol (anhyd.) | 30.0 | | 30.0 | 15.0 | 30.0 | 30.0 | 30.0 | 15.0 |
| Cyclohexanone | | 100.0 | | | | | | |
| Methyl ethyl ketone | | | | *80.0 | | | | |
| Dioxan | | | | *20.0 | | | | |
| Solids content | 20.0 | 20.0 | 20.0 | 20.0 | 30.0 | 25.0 | 20.0 | 20.0 |
| Solvent content | 80.0 | 80.0 | 80.0 | 80.0 | 70.0 | 75.0 | 80.0 | 80.0 |

* Optionally.

In the above examples paraffin wax has been preferred since it is easily available and is representative of a typically good moistureproofing agent. It should be clearly understood that the invention contemplates the use of other moistureproofing agents. With particular reference to Example XIV, montan wax may, if desired, be substituted for the spermaceti. In Example XVII either solvent mixture may be employed successfully.

The above described compositions may be cast into pellicular structures, as for example, sheets or films suitable for wrapping materials. In order to obtain a particularly clear, transparent and moistureproof product, however, certain conditions must be observed. The conditions for casting pellicles in a continuous manner will usually be satisfactory for discontinuous operation, as by casting on glass or metal plates, mandrels, or the like, although the reverse may not be true. The differences are slight, however, usually involving merely a solvent adjustment and the present specification will enable one skilled in the art to make these adjustments without difficulty.

For convenience the method for casting pellicles, such as sheets or films, in a continuous manner, will be described in detail, using what is commonly known as a "wheel casting" method. A continuous "band casting" method can be used if appropriate consideration is given to the required casting conditions and similarly a discontinuous or "plate casting" method can be used advantageously for certain purposes.

edges of the hopper. The wheel surface is maintained at a temperature of about 45–60° C.

As an alternative for the deposition of a uniform layer of casting composition on the wheel surface, the hopper may be provided with a pair of adjustable hopper lips which together form an extrusion orifice in the shape of an elongated slit. By adjusting the width of the slit, a given predetermined amount of casting composition will be extruded in a sheet-like form and will be deposited as such on the surface of the wheel which is caused to rotate at a peripheral speed commensurate to the linear extrusion speed.

The hopper is preferably located in a casting chamber in which the atmosphere is quiescent and is maintained at a temperature of about 45–60° C. As the wheel revolves, the smooth, uniform layer of casting composition emerges from the casting chamber into a drying chamber which encloses the casting wheel. Air passing through the drying chamber, at a temperature of about 70–80° C. or higher removes the solvent or solvents from the composition so that after approximately four-fifths of a revolution of the wheel (a matter of one to ten minutes, depending on the rate of casting selected for the particular composition, the thickness of the desired pellicle and the size of the casting wheel), sufficient solvent has been removed to permit the pellicular deposit of film-forming ingredients to be stripped from the wheel surface and carried over suitable rolls to a conditioning chamber through which air is passed at a suitable elevated temperature and relative humidity to effect complete removal of the solvents and to develop the moistureproof properties of the pellicle to the highest degree. The pellicle is led, from the conditioning chamber over one or more cooling rolls, after which it may be wound on to a suitable core or mandrel or optionally, it may be cut off at predetermined intervals to produce a "cut-to-size" sheeted stock.

In practicing the above described method, the solids concentration of the casting composition, the distance of the doctoring edge of the hopper or the doctor knife, as the case may be, from the wheel surface, the amount of composition metered to the hopper and the speed of revolution of the casting wheel should all be so controlled that the pellicle will have the desired thickness which in the case of wrapping materials should be less than 0.005" and preferably less than 0.002".

In order to produce clear, transparent, non-tacky, flexible, moistureproof pellicles, it is essential that the pellicle be cast and dried at a temperature which at least insures the homogeneity of the casting composition. If the highest degree of moistureproofness is desired the pellicle should, at some time during the manufacture, be submitted to a temperature equal to or higher than the melting point of the wax or other moistureproofing agent in the composition. Appropriate conditions can be obtained by having the surface of the casting wheel at or above the crystallization point of the wax while the drying air is somewhat above or below this temperature although in no case can the temperature of the air be so low as to permit chilling of the surface of the composition layer to a point below the crystallization point of the wax. Optionally, the wheel surface may be somewhat below the crystallization point of the wax while the air temperature is above the wax crystallization point, but here, the temperature of the wheel surface must never be so low as to permit the crystallization of the wax from the composition.

The maintenance of these proper temperature conditions is important to the successful operation of the invention. If the temperature of the thin layer of composition is permitted to fall very low before substantially all of the solvent has been removed, there is danger of wax crystallization. Even though mass crystallization of the wax is substantially avoided, there is still danger of wax crystallizing on the surface of the layer, thereby inhibiting the evaporation of the remaining solvents in which case continuous casting becomes impractical while the pellicle will frequently be blushed and/or hazy. As noted above, the atmosphere of the casting chamber is maintained at such a temperature as to heat the composition quickly as it exudes from the hopper or at least prevent any cooling effects before the layer passes into the drying chamber.

Substantially all of the solvent must be removed from the pellicle before it is wound into the final roll. Most of the solvent is, of course, removed in the drying chamber while the residual solvent is removed in the conditioning chamber. It is in fact preferable that a small amount of solvent remain in the pellicle when it is stripped from the casting wheel so as to equalize any possible difference in characteristics of the opposite surfaces of the pellicle as well as to enhance the moistureproof properties. It is at this point that the pellicle can be most conveniently submitted to a temperature equal to or higher than the melting point of the wax to develop moistureproofness to the highest degree.

In the conditioning chamber, the pellicle is rendered solvent free, odorless, and of proper moisture content. Air is passed through the chamber at a temperature of about 50–120° C., the relative humidity being varied from normal (10–20%) to 80–95%, depending on the temperature or results desired. Usually, the air will be heated to about 80–120° C., preferably 90–110° C., while the relative humidity is permitted to be about 10–20%. Alternatively, the lower temperatures may be employed while higher humidities prevail. There is frequently some advantage in the use of highly humidified air in effecting complete solvent removal, eliminating accumulation of static electricity, and supplying moisture to the pellicle so that it will not shrink or swell due to loss or gain of moisture from the atmosphere. Better moistureproofness is usually obtained, however, through the use of the preferred conditions.

After conditioning, the pellicle is cooled before being wound into rolls or otherwise collected. This is done to prevent wrinkling, shrinking, sticking of adjacent sheets or the like. The cooling may be accomplished as above described by means of a cooling roll or the pellicle may be led through a chamber through which cold air is passed or cold air blasts may be directed against the film by suitable jets or nozzles. Other convenient means may be adopted without departing from the spirit of the invention.

The above method may be satisfactorily carried out by the use of apparatus constructed in accordance with the following detailed description and accompanying drawing in which, Figure 1 is a diagrammatic representation of a wheel casting machine;

Figure 2 is a diagrammatic representation of a modified form of a wheel casting machine showing certain preferred features of construction. Like parts of the machines are designated by the same reference characters.

Referring now to the drawing and particularly Figure 2 thereof, the casting wheel 1 is provided with facilities for interior heating so that its cylindrical surface which is smooth and highly polished may be maintained at any desired temperature. The wheel is also arranged for positive drive in the direction indicated, rotating on the axle 1a. The hopper, 2, is connected with a metering pump (not shown) which is in turn connected with a reservoir (also not shown) containing a supply of casting composition. The heated casting chamber 3 encloses the casting hopper 2 and is provided with the air seal 4, which may be of soft velvet or other material which will not scratch or otherwise injure the wheel surface, and the baffle plate 5. The heating elements 6a, b, c, and d are disposed within the drying chamber 6 through which air may be passed by means of the ducts 7 and 7a. The elements 6a, b, c, and d consist of brass plates with heating coils fastened to one side and arranged with the other side concentric to the casting wheel surface spaced about one-fourth of an inch to two inches from the wheel surface. The rolls 8 act as stripper and guide rolls to transfer the cast pellicle from the casting wheel to the conditioner 9 which is provided with support rolls 9a and air ducts 10 and 11. The roll 12 is an internally cooled roll while 13 represents the winding device for accumulating the pellicle into a suitable mill roll.

In operation, according to one embodiment of the invention, the casting composition is metered to the hopper 2 from which it exudes in a thin layer on to the surface of the revolving wheel 1. The heated chamber 3 and the air seal 4 maintain a heated quiescent atmosphere while the baffle plate 5 forms a high concentration of solvent vapor close to the freshly cast layer of composition. The edge of the hopper nearest the baffle 5 acts as a doctor to insure a smooth, uniform layer of casting composition. As the wheel revolves, the freshly deposited layer of casting composition passes into the region beneath the heating element 6a where the air is still relatively quiescent. At this point the composition is rapidly heated to the desired temperature while the removal of solvent is minimized initially by the quiescent condition of the air. This step is of particular importance if clear, transparent, moistureproof pellicles are to be secured. The wheel then carries the continuous layer of casting composition through the region beneath heating elements 6b, c, and d during which time air is blown through the chamber either concurrently or counter-currently by means of the ducts 7 and 7a. By the time the wheel has carried the composition to a point opposite the stripper rolls 8, sufficient solvent has been removed to permit the pellicle to be stripped from the wheel without tearing, stretching or distortion, whereupon the pellicle passes around the guide rolls to the support rolls 9a in the conditioner 9 where the last of the solvent is removed and the film is conditioned as previously described. After passing around the cooling roll 12, the pellicle is wound on a mandrel or core 13 to form the mill roll. The solvent laden air exhausted from the drying and conditioning chambers may be led to suitable solvent recovery apparatus and the solvents recovered for further use.

Under the preferred conditions of casting, the casting composition, the hopper 2, the casting chamber 3 and the surface of the wheel 1 will be maintained at about 50° C. The air entering the duct 7 or 7a will be heated to about 80° C. while the exhaust air will be at a temperature of about 80–90° C. The heating elements 6a, b, c and d in the drying chamber 6 will be maintained at about 180° C. while the air in the conditioner 9 will be at a temperature of about 90–110° C. When the pellicle is to be 0.002" or less in thickness, the drying time will be about 1–2 minutes although as much as 10 minutes may be required with pellicles ranging up to 0.005" in thickness.

Variation from the above conditions of temperature may be made in accordance with the previously described circumstances. For example, the heating elements may be held at about 160° C. or indeed temperatures above 180° C. may be employed. Longer or shorter drying periods will thus be provided and the only limitation is that the pellicle must be sufficiently dry to permit easy stripping from the wheel at the stripping point while at the same time, the drying is sufficiently rapid to enable economical production of the cast pellicle.

In order to set forth more clearly the application of the casting method to the preparation of moistureproof pellicles from the casting compositions previously described, the following examples will suffice for purposes of illustration although it should be clearly understood that the invention is not limited thereto.

*Example XXII*

The ingredients of the composition of Example XIX are mixed at 35–65° C. to form a clear, homogeneous solution which is filtered and allowed to stand in a closed vessel at 35–65° C. until free of air bubbles. The solution is then metered to the casting hopper and cast in accordance with the preferred casting conditions outlined above and using apparatus as disclosed in Figure II of the drawing. The pellicle obtained will be clear, transparent, non-tacky, flexible and moistureproof with permeability values of the order of 200 or less.

*Example XXIII*

The ingredients of the composition of Example XVIII are mixed, filtered and de-areated as in Example XXII after which the solution is cast in accordance with the preferred casting conditions described except that in the conditioning chamber the air is maintained at a temperature of 54° C. and at a relative humidity of about 52%. A pellicle is obtained which is similar in characteristics to that disclosed in Example XXII.

As previously explained, the general method of casting and the compositions described are adaptable to "plate casting" if desired. The following examples will illustrate the plate casting of compositions previously set forth.

*Example XXIV*

The ingredients of Examples XIV, XVI or XX are mixed to a clear, homogeneous solution at 35–65° C. After filtration and de-aeration at 35–55° C., the solution is cast on the surface of a polished casting plate (glass or metal) by spreading to uniform thickness with a doctor knife having a clearance of 0.013" between the plate and the doctoring edge, the temperature of the plate being 45–50° C. The plate is then covered and the air allowed to remain quiescent for about 15–20 seconds after which air is blown across the surface of the composition for 2–15 minutes or until practically all solvent has been removed, the air being heated to about 65–70° C. After the solvent has been removed, the pellicle is stripped from the plate and hung in an oven at about 70–90° C. or a humidified chamber at or above 60° C. to eliminate the last traces of solvent. If a humidified chamber is used, the relative humidity is preferably 50% or more. Pellicles so obtained will be about 0.001" in thickness and will be clear, transparent, non-tacky, flexible and moistureproof.

*Example XXV*

The composition of Examples XVIII or XXI may be prepared and cast as in Example XXIV except that the casting surface should be maintained at a temperature of 62–65° C. while the air for drying should be at 34–45° C.

*Example XXVI*

The ingredients of Example XV are mixed, filtered and de-aerated at 35–65° C. as previously described and then cast on a plate as in Example XXIV except that the plate surface is maintained at 80–85° C. while the drying air is heated to 60–70° C.

The differences in temperature of casting surfaces and drying airs as set forth in Examples XXIV to XXVI are required by the solvent or solvent mixtures employed because of the different rates of evaporation of such solvents. From this it is important that if a certain casting temperature is required, proper consideration be given to the solvent balance while conversely a given solvent mixture will require a certain casting temperature. For example, if it should be necessary to cast at 45–50° C. and dry at 65–75° C. because of the wax crystallization point, it will be found necessary to use sym-dichlorethane and anhydrous isopropanol in the ratio of 7:3 if those solvents are to be used. On the other hand, if the casting temperature is not so critical because of the wax but for solution purposes a solvent mixture comprising these same solvents in the same proportions must be used; then it will be necessary to adopt the same conditions for casting, namely, a casting temperature of 45–50° C. and a drying temperature of 65–75° C.

The following example will illustrate the application of the invention to the casting of pellicles having a cellulose ether as the cellulose derivative.

*Example XXVII*

| | |
|---|---|
| Ethyl cellulose | 82.0 |
| Ethyl p-toluene sulfonamide | 10.0 |
| Hydrogenated rosin | 5.0 |
| Paraffin (M. P. 62° C.) | 3.0 |

These components are dissolved in a mixture consisting of 80 parts of toluene and 20 parts of n-propanol to form a solution containing 20% solids. After filtration and de-aeration, the composition is cast on a plate as in Example XXIV, the surface of which is maintained at 65° C. while the drying air is heated to about 60–90° C.

While the preceding discussion has been concerned with the preparation of clear and substantially colorless pellicular structures, it is within the purview of this invention to produce colored, opaque, opalescent or otherwise modified pellicles by incorporating dyes, pigments or the like in the casting composition or by any other means.

The products of this invention, especially pellicles suitable for use as wrapping material, possess the very marked advantage of being highly moistureproof, in addition to being flexible, clear, transparent and non-tacky. When prepared from properly purified ingredients, the products are substantially odorless, tasteless and non-toxic, making them especially useful as wrappers for moist or wet foodstuffs such as butter, fish, fruits, fresh vegetables or the like. As distinct from other types of known moistureproof wrapping materials the present pellicles are inherently moistureproof rather than rendered moistureproof by virtue of a special coating.

Practice in accordance with the method of this invention renders possible the production of inherently moistureproof pellicular structures in a continuous and economical manner which avoids the necessity for a separate pellicle coating operation with all the attendant difficulties and repeated handlings.

Obviously, many changes and modifications can be made in the specific details set forth above without departing from the nature and spirit of the invention. The invention is therefore not to be restricted to the above details except as set forth in the appended claim.

I claim:

In a method for the production of self-sustaining moistureproof pellicles of an organic acid ester of cellulose which comprises casting an organic cellulose ester composition containing from about 25% to about 35% by weight of plasticizer, from about 0.1% to about 1% of moistureproofing agent, from about 1.0% to about 10% of gum elemi for blending said moistureproofing agent with the other constituents of said composition, the remainder of said composition being an organic acid ester of cellulose, said composition being dissolved in a solvent therefor, maintaining said composition during the casting step at a temperature sufficiently high to retain the moistureproofing agent in complete solution, evaporating the greater part of the solvent from said composition by means of circulating air having a temperature of at least 70° C., stripping the thus formed pellicle from the casting surface, completing the removal of solvent and conditioning said pellicle by means of circulating air having a temperature of at least 80° C. and a relative humidity of between about 10% to about 20%, cooling said pellicle and collecting the same.

AMBROSE W. STAUDT.